United States Patent
Asano (10) Patent No.: US 10,493,581 B2
(45) Date of Patent: Dec. 3, 2019

(54) MACHINE TOOL

(71) Applicant: FANUC CORPORATION, Yamanashi (JP)

(72) Inventor: Keita Asano, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/212,866

(22) Filed: Dec. 7, 2018

(65) Prior Publication Data
US 2019/0176283 A1    Jun. 13, 2019

(30) Foreign Application Priority Data
Dec. 13, 2017 (JP) ................................. 2017-238424

(51) Int. Cl.
*B23Q 11/08* (2006.01)

(52) U.S. Cl.
CPC ...... *B23Q 11/0825* (2013.01); *B23Q 11/0891* (2013.01); *Y10T 409/30392* (2015.01); *Y10T 483/115* (2015.01)

(58) Field of Classification Search
CPC . B23Q 11/08; B23Q 11/0816; B23Q 11/0825; B23Q 11/0875; B23Q 11/0891; B23Q 11/0042; B23Q 11/0053; B23Q 11/0067; B23Q 2011/0808; Y10T 483/115; Y10T 408/91; Y10T 409/30392

(Continued)

(56) References Cited

U.S. PATENT DOCUMENTS 3,704,959 A * 12/1972 John ................. B23Q 11/0825
                                                    408/241 G
4,742,609 A *  5/1988 Neumann ............... B23Q 1/01
                                                    29/26 A (Continued)

FOREIGN PATENT DOCUMENTS

JP   S59191238 U   12/1984
JP   H04070447 U    6/1992

(Continued)

OTHER PUBLICATIONS

Decision to Grant a Patent issued by the Japanese Patent Office in relation to Japanese Application No. 2017-238424 dated Jul. 30, 2019 (3 pages) along with English language translation (2 pages).

*Primary Examiner* — Alan Snyder
*Assistant Examiner* — Yasir A Diab
(74) *Attorney, Agent, or Firm* — Robert P. Michal, Esq.; Carter, DeLuca & Farrell LLP (57) ABSTRACT

A machine tool has a splash guard and a guiding section. The splash guard has a first sidewall portion on which an end portion of a telescopic cover abuts, a slope portion slanting from the first sidewall portion along an expansion and contraction direction of the telescopic cover, a second sidewall portion perpendicularly extending downward from the slope portion, and a bottom portion horizontally extending from the second sidewall portion more inward than a lower end of the slope portion in the splash guard. The guiding section is disposed more inward than the lower end of the slope portion in the splash guard and configured to guide the cutting fluid falling from the slope portion, toward the bottom portion.

5 Claims, 5 Drawing Sheets

(58) Field of Classification Search
USPC .......... 74/608, 609, 612; 160/185, 202, 220, 160/222; 451/451, 455, 457
See application file for complete search history.

(56) References Cited

U.S. PATENT DOCUMENTS

| | | | | |
|---|---|---|---|---|
| 4,955,770 | A * | 9/1990 | Kitamura | B23Q 1/015 384/16 |
| 5,181,898 | A * | 1/1993 | Piotrowski | B23Q 1/66 29/DIG. 56 |
| 5,263,800 | A * | 11/1993 | Chen | B23Q 11/005 29/DIG. 101 |
| 5,704,884 | A * | 1/1998 | Uemura | B23Q 3/1554 483/3 |
| 6,120,222 | A * | 9/2000 | Hiramoto | B23Q 11/0042 409/134 |
| 6,120,223 | A * | 9/2000 | Hirose | B23Q 11/0816 29/DIG. 56 |
| 6,662,685 | B2 * | 12/2003 | Kuriki | B23Q 11/08 277/645 |
| 9,339,908 | B2 * | 5/2016 | Sato | B23Q 11/0053 |
| 2004/0047700 | A1 | 3/2004 | Maeda | |
| 2005/0031426 | A1 * | 2/2005 | Hiramoto | B23Q 1/01 409/134 |
| 2005/0082118 | A1 * | 4/2005 | Funakoshi | B23Q 1/28 182/170 |
| 2011/0226107 | A1 * | 9/2011 | Mizuta | B23Q 11/0858 83/177 |
| 2013/0255066 | A1 | 10/2013 | Krieg | |
| 2014/0241824 | A1 * | 8/2014 | Inaguchi | B23Q 11/08 409/137 |

FOREIGN PATENT DOCUMENTS

| | | |
|---|---|---|
| JP | 06-091457 A | 4/1994 |
| JP | 2000015577 A | 1/2000 |
| JP | 2001087964 A | 4/2001 |
| JP | 2001205542 A | 7/2001 |
| JP | 2002-126969 A | 5/2002 |
| JP | 2002-233926 A | 8/2002 |
| JP | 2003-94280 A | 4/2003 |
| JP | 2010023202 A | 2/2010 |

* cited by examiner

MACHINE TOOL

CROSS-REFERENCE TO RELATED APPLICATION

This application is based upon and claims the benefit of priority from Japanese Patent Application No. 2017-238424 filed on Dec. 13, 2017, the contents of which are incorporated herein by reference.

BACKGROUND OF THE INVENTION

Field of the Invention

The present invention relates to a machine tool having a mechanism for discharging cutting chips such as cutting particles, cutting scraps and the like, which are produced through cutting operations of workpieces, outside the machine tool by using cutting fluid.

Description of the Related Art

Japanese Laid-Open Patent Publication No. 2003-094280 discloses a machine tool which is equipped with a bed, a column standing upward on the bed, a spindle head supported on the column movably in X, Y and Z directions orthogonal to one another, a spindle rotatably supported on the spindle head, and a table disposed on the bed.

In this machine tool, telescopic covers provided at four places, i.e., front, rear, right and left sides of the table, a splash guard surrounding the circumference of the bed, and slant covers extending inside from sidewalls of the splash guard are configured to guide cutting fluid to a trough, and then the slant covers extending from the machine front side toward the machine rear side enables the cutting fluid to flow toward the machine rear side.

SUMMARY OF THE INVENTION

The above-described telescopic covers are arranged so that the sidewalls of the splash guard are in abutment on end portions of the telescopic covers. However, it may be the case that cutting fluid flows between the end portions of the telescopic covers and the sidewalls. In this case, there is a concern that the cutting fluid falls on the bed and flows outside the machine tool through an unintended portion between the bed and the splash guard.

The present invention has been made in order to solve the aforementioned problem, and it is an object of the present invention to provide a machine tool capable of restraining cutting fluid from flowing outside the machine tool through an unintended portion.

In one aspect, the present invention resides in a machine tool including a bed, covers configured to be expandable and contractible and respectively protect a moving mechanism for moving a saddle relative to the bed in a first direction and another moving mechanism for moving a table relative to the saddle in a second direction intersecting the first direction, and a splash guard attached to the bed and configured to surround the saddle, the table and the covers. The splash guard includes a first sidewall portion on which an end portion of at least one of the covers abuts, a slope portion slanting so as to descend from the first sidewall portion in an expandable and contractible direction of the at least one cover toward an inner side of the splash guard, the slope portion being configured to enable cutting fluid flowing between the first sidewall portion and the end portion of the at least one cover to flow downward toward the inner side of the splash guard, a second sidewall portion perpendicularly extending downward from the slope portion, and a bottom portion horizontally extending from the second sidewall portion more inward than a lower end of the slope portion in the splash guard, the bottom portion being configured to receive the cutting fluid. The machine tool further includes a guiding section disposed more inward than the lower end of the slope portion in the splash guard, the guiding section being configured to guide toward the bottom portion the cutting fluid falling from the slope portion.

In the machine tool, in the case where cutting fluid flows between the end portion of the cover and the first sidewall portion and then the fluid leaks out to the cover, the cutting fluid flows along the slope portion and is guided by the guiding section to thereby fall onto the bottom portion. Accordingly, it is possible to prevent the cutting fluid from falling onto the bed even if the cutting fluid flows between the end portion of the cover and the first sidewall portion. Consequently, cutting fluid can be prevented from flowing out of the machine tool through an unintended portion such as a connection portion between the bed and the splash guard or the like.

The above and other objects, features, and advantages of the present invention will become more apparent from the following description when taken in conjunction with the accompanying drawings, in which a preferred embodiment of the present invention is shown by way of an illustrative example.

DESCRIPTION OF THE PREFERRED EMBODIMENTS

Hereinafter, a machine tool according to the present invention will be described in detail based on a preferred embodiment with reference to the accompanying drawings.

Embodiment

Figure 1:
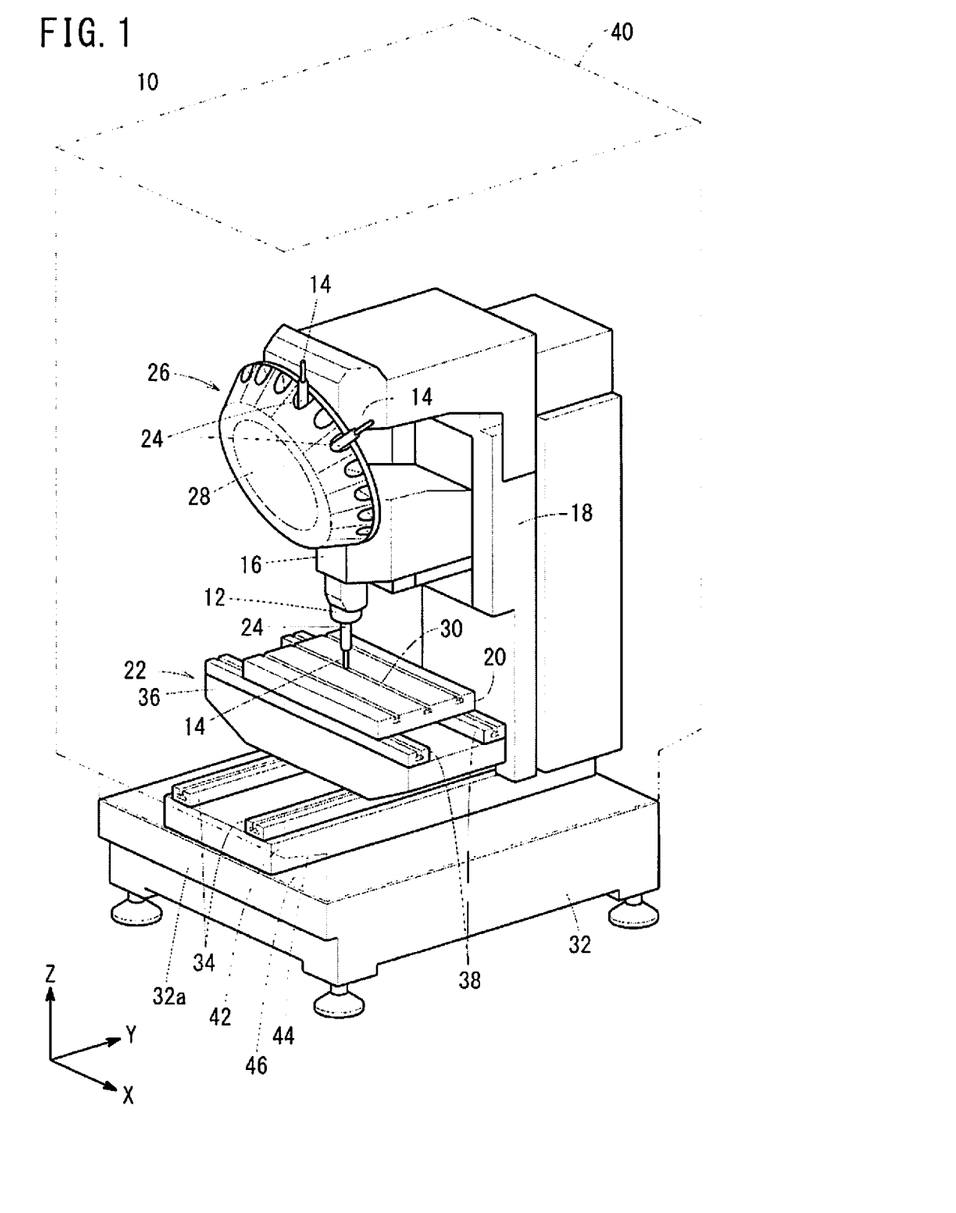
FIG. 1 is a schematic perspective view showing the configuration of a machine tool according to an embodiment of the present invention.

FIG. 1 is a schematic perspective view showing the configuration of a machine tool 10 according to the embodiment. The machine tool 10 machines a workpiece (not shown) with a tool 14 for cutting, attached to a spindle 12. Incidentally, the workpiece is also called an object to be machined.

The machine tool 10 is equipped with the spindle 12, a spindle head 16 supporting the spindle 12 rotatably about a rotary axis extending in a vertical direction, a column 18 for moving the spindle head 16 in the vertical direction, a table 20 for fixedly supporting a workpiece, and a table drive unit 22 for moving the table 20 in a first direction and a second direction intersecting the first direction.

The first direction and the second direction are assumed to be orthogonal to each other, wherein the first direction is assumed as Y direction, while the second direction is assumed as X direction. Further, a direction orthogonal to the Y direction and the X direction is assumed as Z direction. Incidentally, a downward direction toward which the gravity acts is −Z direction, while an upward direction is +Z direction. Through the movement of the spindle 12 in the Z direction and the movements of the table 20 in the X direction and the Y direction, the machine tool 10 is able to machine the workpiece three-dimensionally.

The tool 14 is held by a tool holder 24. The tool holder 24 is able to be attached to or detached from the spindle 12, and each tool 14 is attached to the spindle 12 through the tool holder 24. The tool holder 24 is inserted into a tool attachment hole (not shown) provided at a distal end portion of the spindle 12, so that the tool 14 is attached to the spindle 12. The tool 14 is rotated together with the spindle 12. The machine tool 10 is configured as a machining center capable of changing the tool 14 to be attached to the spindle 12 by an automatic tool changer 26. The automatic tool changer 26 has a tool magazine 28 capable of storing (holding) a plurality of tools 14 each held by the tool holder 24. As those tools 14, there are exemplified spring necked tools, drilling tools, end mills, milling cutters, and the like.

The table 20 is disposed under the spindle 12. The table 20 has, on an upper surface thereof, a plurality of lock grooves 30 which extend straight in the X direction and which are arranged at predetermined intervals in the Y direction. The workpiece may be fixed on the table 20 through workpiece fixing jigs (not shown). The workpiece fixing jigs are configured to fix the workpiece on the upper surface of the table 20 by utilizing the lock grooves 30.

The table drive unit 22 is supported on the bed 32. The table drive unit 22 has a Y-axis slide unit 34, a saddle 36, and an X-axis slide unit 38. The saddle 36 is supported movably relative to the bed 32 in the Y direction through the Y-axis slide unit 34. The table 20 is supported movably relative to the saddle 36 in the X direction through the X-axis slide unit 38.

The saddle 36 is connected to a Y-axis moving mechanism (not shown) for moving the saddle 36 relative to the bed 32 in the Y direction, while the table 20 is connected to an X-axis moving mechanism (not shown) for moving the table 20 relative to the saddle 36 in the X direction. Each of the Y-axis moving mechanism and the X-axis moving mechanism is, for example, a mechanism for transmitting the rotational motion of a servomotor into a linear motion to transmit the linear motion to the saddle 36 or the table 20. Each of the moving mechanisms has a ball screw, a nut and the like, for example. As each of the Y-axis moving mechanism and the X-axis moving mechanism, it is possible to utilize a well-known mechanism.

The machine tool 10 is provided with a splash guard 40 which encloses a machining area of the machine tool 10 and which prevents cutting chips such as cutting particles, cutting scraps and the like produced through machining operations, and cutting fluid from scattering around the area. Incidentally, within the machining area, a nozzle (not shown) for ejecting cutting fluid toward the tool 14 during a machining operation is provided in addition to the aforementioned spindle 12, spindle head 16, column 18, table 20 and table drive unit 22.

Here, in order to protect the aforementioned Y-axis moving mechanism and X-axis moving mechanism from chips produced during a machining operation as well as from cutting fluid, the machine tool 10 is provided with a plurality of telescopic covers which respectively cover the Y-axis moving mechanism and the X-axis moving mechanism from upper side.

Figure 2:
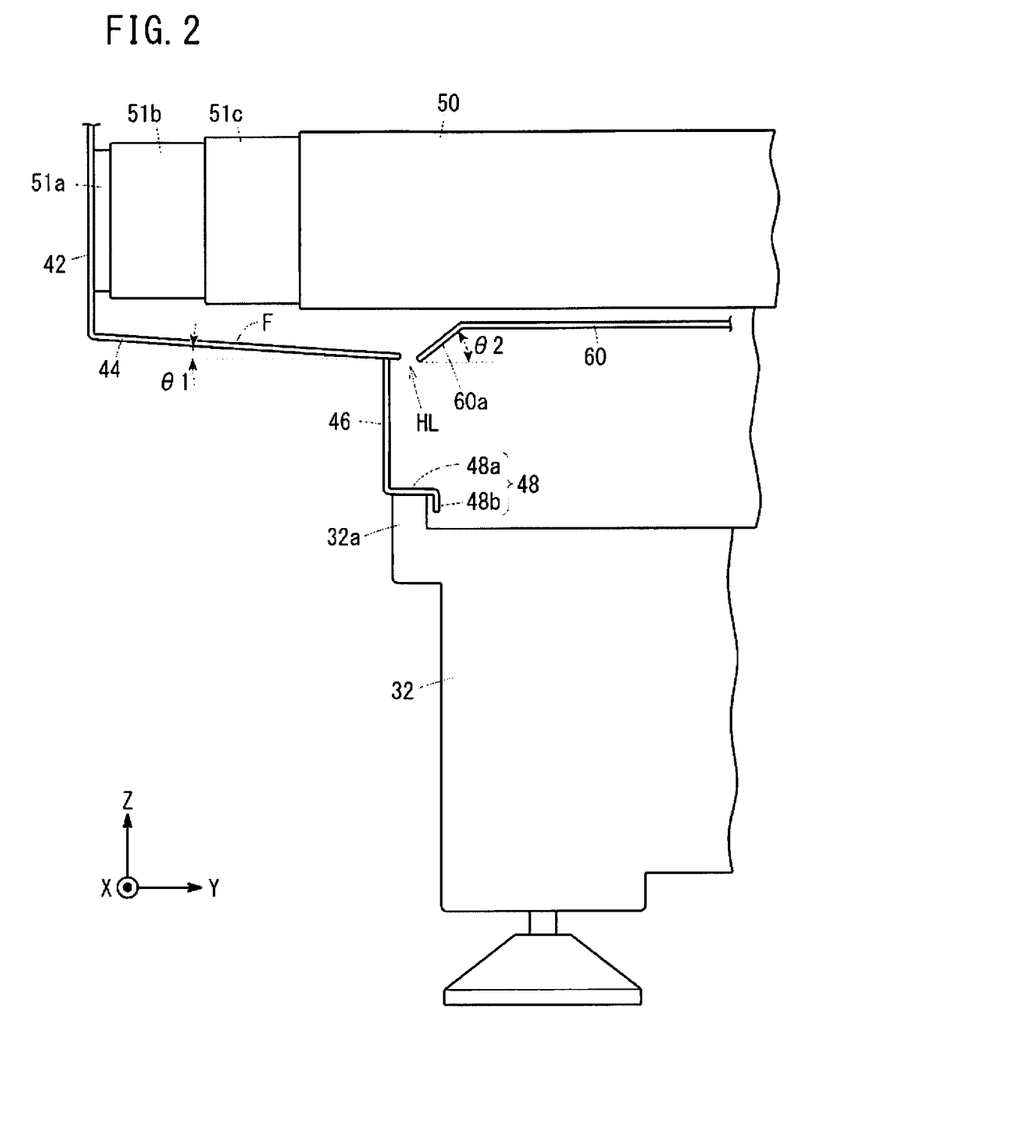
FIG. 2 is a schematic view of a portion of the machine tool shown in FIG. 1 as viewed laterally.

FIG. 2 is a schematic view of a portion of the machine tool 10 as viewed laterally. The telescopic cover 50 covering the Y-axis moving mechanism is expanded and contracted in accordance with movement of the table 20 (saddle 36) in the Y direction. FIG. 2 shows a portion of the telescopic cover 50 which is expanded and contracted in accordance with the movement of the table 20 (saddle 36) in the Y direction, while the telescopic covers which are expanded and contracted in accordance with the X-axis movement of the table 20 (saddle 36) are omitted from illustration.

In the present embodiment, for the sake of brevity in description, it is assumed that the telescopic cover 50 has three cover pieces 51a to 51c and that these three cover pieces 51a to 51c are assembled telescopically or in a nesting manner, so that the telescopic cover 50 is configured to be expandable and contractible.

An end portion of the telescopic cover 50 is in abutment on one side cover of the four side covers of the splash guard 40 surrounding the four sides of the machining area. Specifically, this cover is a side cover in the +Y direction or −Y direction with respect to the column 18. Incidentally, in a case where a member is attached to the end of the telescopic cover 50 and the member is in abutment on the side cover, the member is regarded as being included in the end portion of the telescopic cover 50.

As shown in FIG. 2, the side cover in the +Y direction or −Y direction has a first sidewall portion 42, a slope portion 44, a second sidewall portion 46, and a bottom portion 48. The first sidewall portion 42 extends perpendicularly, on which the end portion of the telescopic cover 50 is held in abutment.

The slope portion 44 is a region which enables cutting fluid flowing between the first sidewall portion 42 and the end portion of the telescopic cover 50 to flow downward toward the inner side of the splash guard 40. The slope portion 44 has a slope surface F which slants so as to descend as it goes from the first sidewall portion 42 toward the inner side of the splash guard 40 in the expansion and contraction direction of the telescopic cover 50. The width of the slope portion 44 is set to be wider than the width of the telescopic cover 50. Incidentally, the widths of the slope portion 44 and the telescopic cover 50 are the lengths in a direction perpendicular to the expansion and contraction direction of the telescopic cover 50.

The second sidewall portion 46 is located on the inner side of the splash guard 40 relative to the first sidewall portion 42 and perpendicularly extends downward from a lower end of the slope portion 44.

The bottom portion 48 is a region for receiving cutting fluid and has a horizontal region 48a which horizontally extends from the second sidewall portion 46 more inwardly than the lower end of the slope portion 44 in the splash guard 40. This horizontal region 48a is seated on a salient 32a which is formed to protrude upward on a verge portion of an upper surface of the bed 32.

The horizontal region 48a has, at a distal end thereof, a protrusion 48b extending downward. Incidentally, the position at which the protrusion 48b is mounted may be any other position than the distal end of the horizontal region 48a as long as the position is located more inward of the splash guard 40 than the salient 32a of the bed 32. Further, although being spaced from the bed 32, a lower end of the protrusion 48*b* may be in abutment on the bed 32.

In the machine tool 10, a guiding section 60 is provided inside the splash guard 40. The guiding section 60 is a region for guiding toward the bottom portion 48 the cutting fluid which falls from the slope portion 44, and is located more inward than the lower end of the slope portion 44 in the splash guard 40. The guiding section 60 has a slant region 60*a* which slants to become higher as the guiding section 60 extends from the lower end of the slope portion 44 toward the inner side of the splash guard 40 along the expansion and contraction direction of the telescopic cover 50. The slant region 60*a* is fixed to the bed 32 through a support member (not shown).

Incidentally, in a case where the slant angle θ2 of the slant region 60*a* is larger than the slant angle θ1 of the slope portion 44, it is possible to prevent cutting fluid from moving toward the inner side of the splash guard 40 even when the cutting fluid flows down swiftly along the slope portion 44. Accordingly, it is preferable that the slant angle θ2 of the slant region 60*a* be larger than the slant angle θ1 of the slope portion 44.

A through hole HL is provided at a joining portion between the slant region 60*a* and the slope portion 44. This through hole HL may be provided perpendicularly or may be provided obliquely such that the position of its opening on the bottom portion 48 side is located closer to the side cover than the position of its opening on the telescopic cover 50 side.

As described hereinabove, in the machine tool 10 according to the present embodiment, in a case where cutting fluid flows between the first sidewall portion 42 and the end portion of the telescopic cover 50 and thus leaks to the underside of the telescopic cover 50, the cutting liquid flows on the first sidewall portion 42 and then reaches the slope portion 44. The cutting fluid having reached the slope portion 44 flows along the slope portion 44 and is guided by the guiding section 60 to fall from the through hole HL on the bottom portion 48.

Therefore, according to the machine tool 10 of the present embodiment, it is possible to prevent cutting fluid from falling on the bed 32 even when the cutting fluid flows between the end portion of the telescopic cover 50 and the first sidewall portion 42. As a result, cutting fluid does not flow out of the machine tool from between the salient 32*a* of the bed 32 and the bottom portion 48 of the splash guard 40, and hence cutting fluid is prevented from flowing out of the machine tool through an unintended place.

Further, the bottom portion 48 is provided with the protrusion 48*b* extending from the horizontal region 48*a* toward the bed 32. With this configuration, even if cutting fluid falls from the through hole HL of the guiding section 60 on the bed 32 and scatters, the scattering cutting fluid is prevented by the protrusion 48*b* from entering into between the salient 32*a* of the bed 32 and the bottom portion 48.

Modifications

As described hereinabove, the foregoing embodiment has been described as one example of the present invention. However, the technical scope of the present invention is not limited to the scope of description in the foregoing embodiment. It is of course possible to add various modifications or improvements to the foregoing embodiment. It is clear from the appended claims that the forms incorporating such modifications or improvements are also encompassed in the technical scope of the present invention.

First Modification

Figure 3:
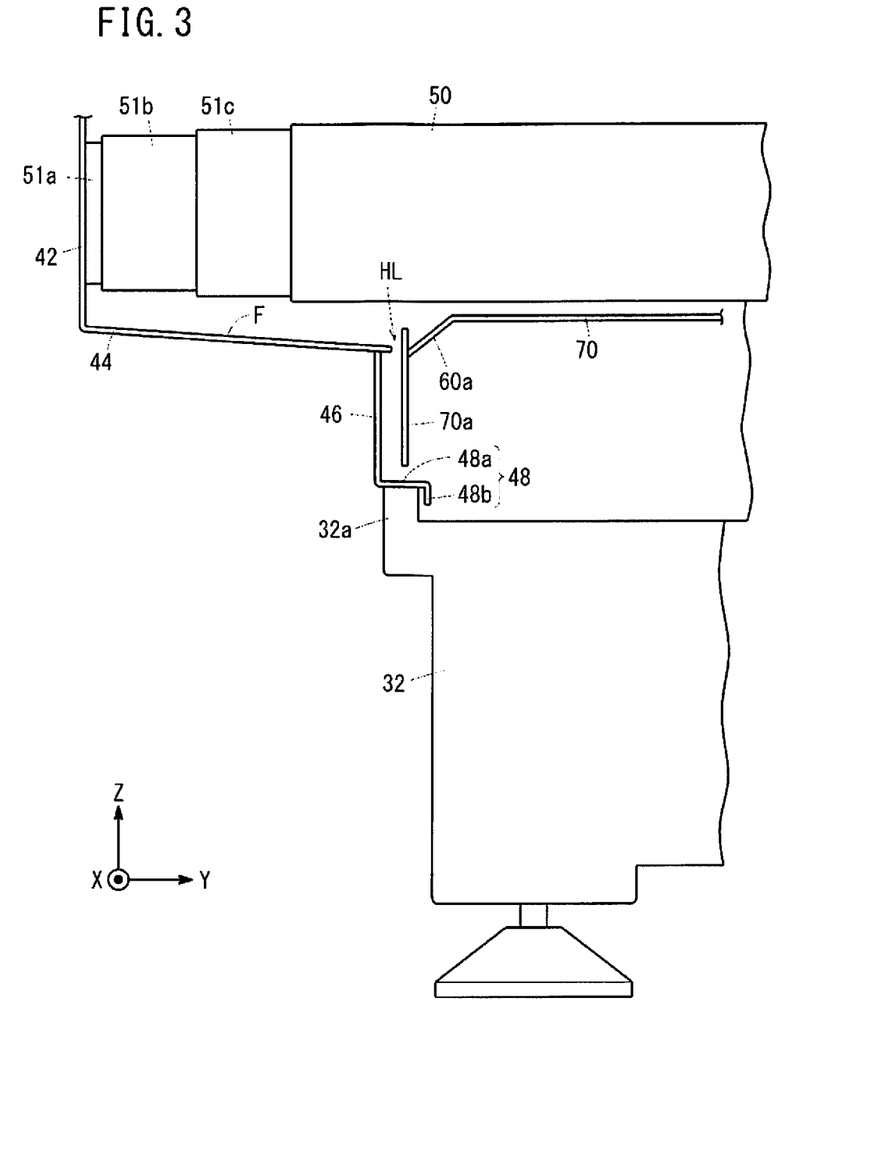
FIG. 3 is a schematic view showing a guiding section according to a first modification at the same point of view as FIG. 2.

FIG. 3 is a schematic view showing a guiding section 70 in a first modification at the same point of view as FIG. 2. In addition to the slant region 60*a* and the through hole HL in the foregoing embodiment, the guiding section 70 in the first modification further has a barrier wall portion 70*a* which prevents cutting fluid falling through the through hole HL from heading for the inner side of the splash guard 40.

The barrier wall portion 70*a* vertically extends along the second sidewall portion 46. Further, the barrier wall portion 70*a* is inserted into the through hole HL and is fixed at its inserted portion to a slant region 60*a* by welding or the like. This barrier wall portion 70*a* may be constituted by a plate-shaped member. An upper end of the barrier wall portion 70*a* is located higher than the lower end of the slope portion 44, while a lower end of the barrier wall portion 70*a* is located lower than the lower end of the slope portion 44. Incidentally, although being spaced from the bottom portion 48, the lower end of the barrier wall portion 70*a* may be in abutment on the bottom portion 48.

When cutting fluid flows along the slope portion 44, the cutting fluid passes through the through hole HL of the guiding section 70 and falls downward. At this time, the barrier wall portion 70*a* prevents the cutting fluid from heading for the inner side of the splash guard 40. Therefore, according to the guiding section 70 of the first modification, even when cutting fluid flows down vigorously along the slope portion 44, it is possible to prevent the cutting fluid from moving toward the inner side of the splash guard 40.

Further, because the lower end of the barrier wall portion 70*a* is located lower than the lower end of the slope portion 44, it is possible to prevent the cutting fluid having fallen on the bottom portion 48 from scattering toward the bed 32.

Second Modification

Figure 4:
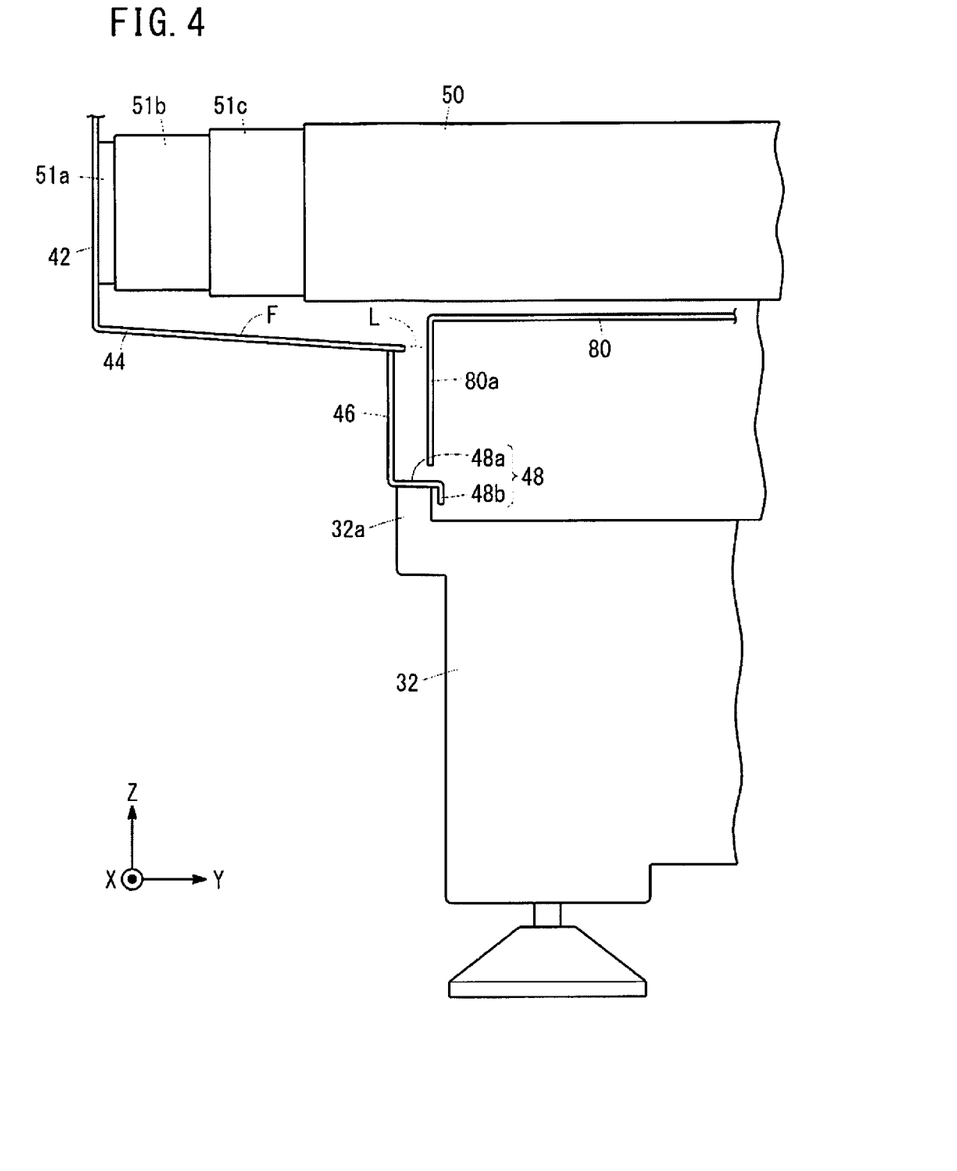
FIG. 4 is a schematic view showing a guiding section according to a second modification at the same point of view as FIG. 2.

FIG. 4 is a schematic view showing a guiding section 80 of a second modification at the same point of view as FIG. 2. The guiding section 80 in the second modification has a barrier wall portion 80*a*, but has neither the slant region 60*a* nor the through hole HL. The barrier wall portion 80*a* is not joined to the slope portion 44 and vertically extends along the second sidewall portion 46. However, the barrier wall portion 80*a* may be joined to the slope portion 44. In the case where the barrier wall portion 80*a* is joined to the slope portion 44, a through hole is formed at the joining portion. An upper end of the barrier wall portion 80*a* is located higher than the extended line L of a slope of the slope portion 44, while a lower end of the barrier wall portion 80*a* is located lower than the extended line L. That is, in the case where the slope surface F is extended toward the inner side of the splash guard 40, the upper end of the barrier wall portion 80*a* is located higher than the extended slope surface, while the lower end of the barrier wall portion 80*a* is located lower than the extended slope surface. Incidentally, although being spaced from the bottom portion 48, the lower end of the barrier wall portion 80*a* may be in abutment on the bottom portion 48.

Even in the case where neither the slant region 60*a* nor the through hole HL is provided as in the guiding section 80 of the second embodiment, cutting fluid falling from the slope portion 44 is prevented by the barrier wall portion 80*a* from heading for the inner side of the splash guard 40. Therefore, according to the guiding section 80 of the second modification, similarly to the guiding section 70 of the first modification, it is possible to prevent the cutting fluid from moving toward the inner side of the splash guard 40 even if the cutting fluid flows down vigorously along the slope portion 44.

Third Modification

Figure 5:
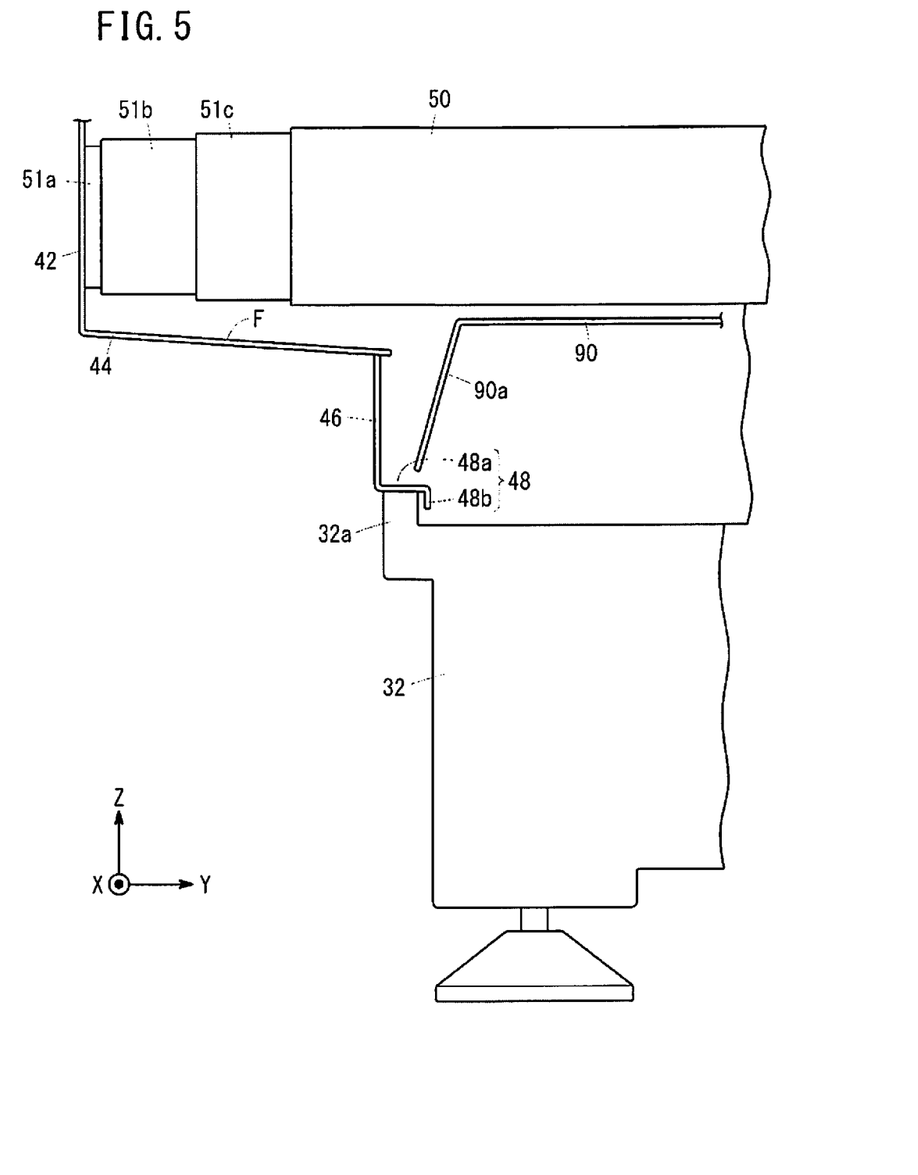
FIG. 5 is a schematic view showing a guiding section according to a third modification at the same point of view as FIG. 2.

FIG. 5 is a schematic view showing a guiding section 90 of a third modification at the same point of view as FIG. 2. The guiding section 90 of the third modification has a barrier wall portion 90a, but has neither the slant region 60a nor the through hole HL. This barrier wall portion 90a slants so as to become closer to the second sidewall portion 46 as it extends downward. An upper end of the barrier wall portion 90a is located higher than an upper end of the slope portion 44, while a lower end of the barrier wall portion 90a is located lower than the lower end of the slope portion 44. Incidentally, although being spaced from the bottom portion 48, the lower end of the barrier wall portion 90a may be in abutment on the bottom portion 48.

In the guiding section 90 of the third modification, the barrier wall portion 90a slants so as to come closer to the second sidewall portion 46 toward the lower side. Thus, it is possible to guide the cutting fluid falling from the slope portion 44, toward the second sidewall portion 46 on the bottom portion 48 side. Accordingly, the cutting fluid having fallen from the lower end of the barrier wall portion 90a on the bottom portion 48 can be prevented from scattering toward the bed 32.

Fourth Modification

In the foregoing embodiment, the end portion of the telescopic cover 50 which expands and contracts in the Y direction in accordance with the movement of the table 20 (saddle 36) in the Y direction abuts on the side cover. However, it may be the case that an end portion of the telescopic cover which expands and contracts in the X direction in accordance with the movement of the table 20 (saddle 36) in the X direction is in abutment on the side cover. In this case, a side cover that is in abutment on the telescopic cover which expand and contract in the X direction is equipped with the aforementioned first sidewall portion 42, slope portion 44, second sidewall portion 46 and bottom portion 48, while one of the guiding sections 60, 70, 80, 90 is provided on the inner side the splash guard 40.

Fifth Modification

Although in the foregoing embodiment, the second sidewall portion 46 is located closer to the inner side of the splash guard 40 than the first sidewall portion 42, the second sidewall portion 46 may lie on a line extending on the first sidewall portion 42. In this case, the second sidewall portion 46 is configured to extend perpendicularly from the upper end of the slope portion 44. In short, it is only necessary for the second sidewall portion 46 to perpendicularly extend downward from the slope portion 44.

Sixth Modification

Although the telescopic cover 50 is used in the foregoing embodiment, a cover used is not limited to the telescopic cover 50 as long as the cover is expandable and contractible and used for protecting a moving mechanism.

Seventh Modification

The foregoing embodiment and the foregoing first to sixth modifications may be arbitrarily combined within a scope in which inconsistency does not occur.

Technical Concepts

Technical concepts graspable from the foregoing embodiment and modifications will be described hereinafter.

The machine tool (10) includes a bed (32), covers (50) configured to be expandable and contractible and respectively protect a moving mechanism for moving a saddle (36) relative to the bed (32) in a first direction and another moving mechanism for moving a table (20) relative to the saddle (36) in a second direction intersecting the first direction, and a splash guard (40) attached to the bed (32) and configured to surround the saddle (36), the table (20) and the covers (50). The splash guard (40) includes a first sidewall portion (42) on which an end portion of at least one of the covers (50) abuts, a slope portion (44) slanting so as to descend from the first sidewall portion (42) in an expansion and contraction direction of the at least one cover (50) toward an inner side of the splash guard (40), the slope portion being configured to enable cutting fluid flowing between the first sidewall portion (42) and the end portion of the at least one cover (50) to flow downward toward the inner side of the splash guard (40), a second sidewall portion (46) perpendicularly extending downward from the slope portion (44), and a bottom portion (48) horizontally extending from the second sidewall portion (46) more inward than a lower end of the slope portion (44) in the splash guard (40), the bottom portion being configured to receive the cutting fluid. The machine tool (10) further includes a guiding section (60, 70, 80, 90) disposed more inward than the lower end of the slope portion (44) in the splash guard (40), the guiding section being configured to guide toward the bottom portion (48) the cutting fluid falling from the slope portion (44).

With this configuration, it is possible to prevent cutting fluid from falling on the bed (32) even if the cutting fluid flows between the end portion of the cover (50) and the first sidewall portion (42). Consequently, cases do not occur in which cutting fluid flows out of the machine tool from between the bed (32) and the splash guard (40), and hence cutting fluid can be prevented from flowing out of the machine tool through an unintended portion.

The guiding section (60) may include a slant region (60a) configured to slant so as to become higher from the lower end of the slope portion (44) toward the inner side of the splash guard (40) along the expansion and contraction direction of the at least one cover (50), and a through hole (HL) provided at a joining portion between the slant region (60a) and the lower end of the slope portion (44). With this configuration, the guiding section (60) can guide cutting fluid so that the cutting fluid falls from the through hole (HL) onto the bottom portion (48).

Preferably, a slant angle ($\theta 2$) of the slant region (60a) of the guiding section (60) is larger than a slant angle ($\theta 1$) of the slope portion (44). With this configuration, even when cutting fluid flows down vigorously along the slope portion (44), the guiding section (60) can prevent the cutting fluid from heading for the inner side of the splash guard (40).

The guiding section (70, 80, 90) may include a barrier wall portion (70a, 80a, 90a) extending vertically and configured to prevent cutting fluid falling from the slope portion (44) from moving toward the inner side of the splash guard (40). With this configuration, even if cutting fluid vigorously flows down along the slope portion (44), the barrier wall portion (70a, 80a, 90a) is capable of preventing the cutting fluid from moving toward the inner side of the splash guard (40).

Preferably, a lower end of the barrier wall portion (70a, 80a, 90a) is located lower than an extended line (L) of a slope of the slope portion (44), while an upper end of the barrier wall portion (70a, 80a, 90a) is located higher than the extended line (L). With this configuration, even if cutting fluid vigorously flows down along the slope portion (44), the barrier wall portion (70a, 80a, 90a) can prevent the cutting fluid from heading for the inner side of the splash guard (40).

What is claimed is:

1. A machine tool comprising a bed, covers configured to be expandable and contractible and respectively protect a moving mechanism for moving a saddle relative to the bed in a first direction and another moving mechanism for moving a table relative to the saddle in a second direction intersecting the first direction, and a splash guard attached to the bed and configured to surround the saddle, the table and the covers,
    wherein the splash guard includes:
    a first sidewall portion on which an end portion of at least one of the covers abuts;
    a slope portion slanting so as to descend from the first sidewall portion in an expansion and contraction direction of the at least one cover toward an inner side of the splash guard, the slope portion being configured to enable cutting fluid flowing between the first sidewall portion and the end portion of the at least one cover to flow downward toward the inner side of the splash guard;
    a second sidewall portion perpendicularly extending downward from the slope portion; and
    a bottom portion horizontally extending from the second sidewall portion more inward than a lower end of the slope portion in the splash guard, the bottom portion being configured to receive the cutting fluid; and
    wherein the machine tool further includes a guiding section disposed more inward than the lower end of the slope portion in the splash guard, the guiding section being configured to guide toward the bottom portion the cutting fluid falling from the slope portion.

2. The machine tool according to claim 1, wherein the guiding section includes:
    a slant region configured to slant so as to become higher from the lower end of the slope portion toward the inner side of the splash guard along the expansion and contraction direction of the at least one cover; and
    a through hole provided at a joining portion between the slant region and the lower end of the slope portion.

3. The machine tool according to claim 2, wherein a slant angle of the slant region of the guiding section is larger than a slant angle of the slope portion.

4. The machine tool according to claim 1, wherein the guiding section includes a barrier wall portion extending vertically and configured to prevent cutting fluid falling from the slope portion from moving toward the inner side of the splash guard.

5. The machine tool according to claim 4, wherein a lower end of the barrier wall portion is located lower than an extended line of a slope of the slope portion, while an upper end of the barrier wall portion is located higher than the extended line.

* * * * *